May 12, 1925.  H. E. SHEDD  1,537,891

CALENDAR

Filed Oct. 30, 1924

Inventor
H. E. Shedd
By
Attorney

Patented May 12, 1925.

1,537,891

UNITED STATES PATENT OFFICE.

HUGH E. SHEDD, OF MINNEAPOLIS, MINNESOTA.

CALENDAR.

Application filed October 30, 1924. Serial No. 746,871.

*To all whom it may concern:*

Be it known that I, HUGH E. SHEDD, a citizen of the United States of America, residing at Minneapolis, in the county of Hennepin and State of Minnesota, have invented certain new and useful Improvements in Calendars, of which the following is a specification.

This invention relates to an improvement in calendars, wherein provision is made for a forecast of weather conditions during the particular days of the month or week indicated on the calendar sheets, the method of providing the forecast indications being such as to render the weather conditions for any particular day or period readily and easily discernible without in any way conflicting with or confusing the usual calendar designations.

The improved method of weather forecast indications consists in applying to the particular day indications of the calendar a definite color scheme according to a predetermined key in which certain colors will indicate certain weather conditions.

The calendar face throughout the date bearing surface will thus appear in distinguishing and clearly separated colors, so that the particular color of a particular date will indicate the weather forecast for that date. Obviously the color scheme may be carried out by a colored background for the space ordinarily inclosing each particular date; a colored strip through but not coextensive with said background; the printing of the date indicating numeral in the particular color, or in various other ways, so long as a particular date presented to the eye of the observer will be immediately and intimately associated with a particular color to indicate by such color the weather forecast for that particular date.

The invention is illustrated in the accompanying drawings, in which.

Figure 3:
Figure 4:
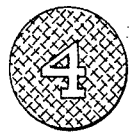
Figure 5:
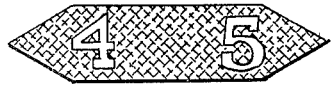

Figs. 3, 4, and 5, are details of modified outlines of colorings for numbers or background.

Figure 1:
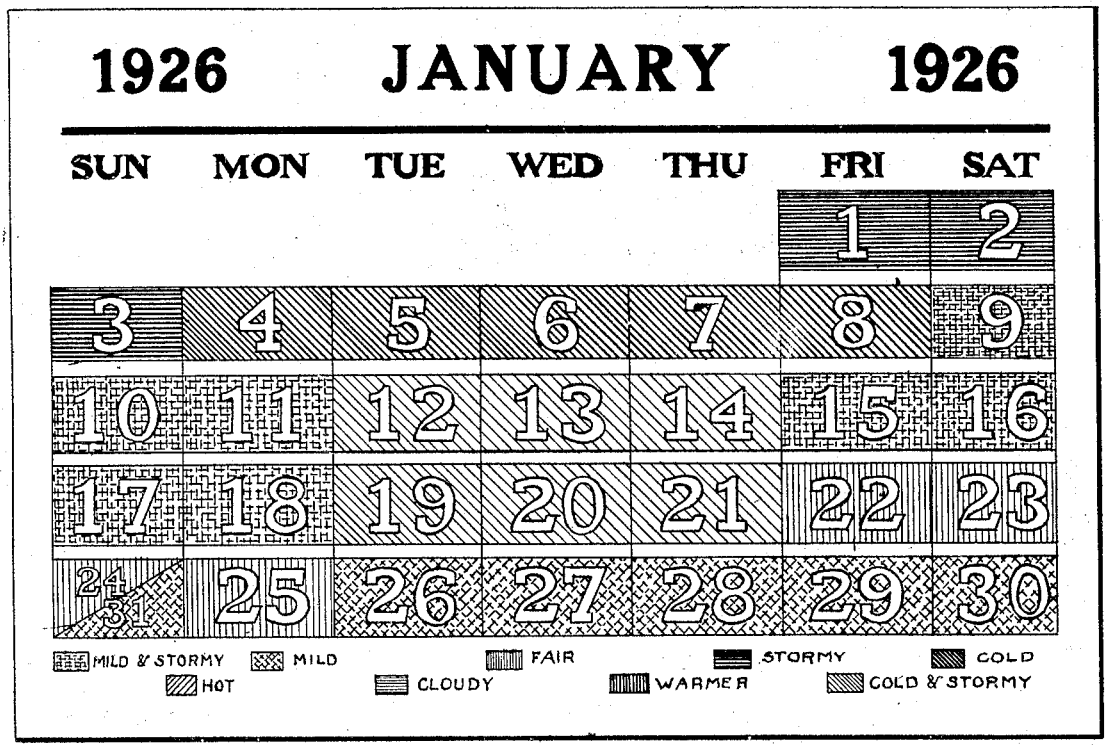
Fig. 1 is a view of a calendar sheet for one month, showing the background of the various dates colored to correspond with a particular key for indicating weather forecasts on the particular date or dates.

As will be plain from Fig. 1, the various days of the month indications occupy particular spaces indicated at 1, and the numerals are printed therein with the space other than that occupied by the numeral colored or tinted in accordance with a particular key to indicate by the color the weather forecast for that particular date. If, as will ordinarily be the case in weather forecast, several successive days are forecast to have substantially the same weather conditions, the color scheme of the successive date spaces will be the same. The line of demarkation between different colors, that is, different weather forecasts, are clear, so that the observer may readily, by merely glancing at the calendar, determine, following a knowledge of the key colors, the particular weather forecast for any day or set of days in a particular period.

Figure 2:
Fig. 2 is a similar view of a portion of a calendar sheet showing a slightly different arrangement of color indications.

Obviously, the fundamental feature of the invention is the provision of clear and well defined coloring for the date spaces of the calendar, and it is apparent that this may be carried out in various ways. While the preferred method is the complete coloring of the space occupied by the particular date, it is nevertheless apparent that the color scheme and weather indication may be equally well carried out by correspondingly coloring the date numerals in accordance with the weather forecast colors, and leaving the background white or in some contrasting color; or, as indicated in Fig. 2, the weather forecast color may be in the form of a comparatively narrow bar or strip of color passing through the date indicating numeral; or the color may be applied in outlines of various geometrical figures within which the date indicating numeral may be placed.

The invention is not concerned with the manner of applying the color, as such may be readily perfected in many ways, the important detail being the utilization of distinctive colors to indicate different weather conditions and the application of these colors in a bold clearly distinguishable manner to the particular day or days of the calendar sheet, in accordance with the weather forecast for such day or days.

The calendar sheets thus prepared present an artistic appearance and the weather forecast colors are readily distinguishable at all distances from which the calendar numerals may be read, and the observer is enabled, by consulting the particular calendar sheet, to readily determine the weather forecast for any particular period as easily as determining the day of the month.

I am aware that it has been heretofore proposed to indicate on the days of the month a weather forecast by comparatively small signs, differing slightly one from the other to indicate different weather conditions. These signs however, are hardly distinguishable one from another at other than ordinary reading distances from the calendar and have to be individually consulted for the particular day or days in which the observer is interested. My invention differs from this method of weather indication by utilizing a color scheme which in itself is the prominent feature of the calendar sheet, and which by the very reason of its color indications is clearly distinguishable beyond ordinary reading distances and indicates not through a sign but by means of a color the weather forecast.

The backgrounds, or outlines about the date indicating numerals, may be of any shape or configuration, some of such different shapes and forms being shown in Figs. 3, 4, and 5. These may constitute the entire background, or only a portion thereof about the numeral, and where the same weather-indicating color includes two or more dates, the ornamental background or outline for such may be a single complete configuration, as in Fig. 5.

What I claim is:

A calendar sheet having clearly defined date spaces, each bearing a particular date number, each of said spaces with the exception of the date number being wholly colored in accordance with a particular color for indicating a weather forecast for that date, the colorings of the weather forecast indications being sharply and distinctively defined over the coloring of the date numbers to thereby permit the weather forecast indication to be determined at any distance from the calendar which permits the date number to be read, the weather forecast colorings of each of the date spaces permitting such colors of adjacent date spaces to merge one into the other in the event of similar weather forecasts or to be sharply defined relative to each other in the event of different weather forecasts.

In testimony whereof I affix my signature.

HUGH E. SHEDD. [L. S.]